(12) United States Patent
Lin et al.

(10) Patent No.: US 8,705,241 B2
(45) Date of Patent: Apr. 22, 2014

(54) ELECTRONIC DEVICE

(75) Inventors: Cheng-Hung Lin, New Taipei (TW); Chih-Yi Wang, New Taipei (TW); Wen-Tai Lin, New Taipei (TW)

(73) Assignee: Wistron Corporation, Hsichih Dist., New Taipei (TW)

( * ) Notice: Subject to any disclaimer, the term of this patent is extended or adjusted under 35 U.S.C. 154(b) by 254 days.

(21) Appl. No.: 13/426,978

(22) Filed: Mar. 22, 2012

(65) Prior Publication Data

US 2012/0287592 A1 Nov. 15, 2012

(30) Foreign Application Priority Data

May 10, 2011 (TW) .............................. 100116337 A (51) Int. Cl.
*H05K 7/16* (2006.01)

(52) U.S. Cl.
USPC .......................................... 361/725; 361/756

(58) Field of Classification Search
USPC .................. 361/679.37, 679.39, 679.45, 725, 361/727–730, 756, 759, 683, 686, 361/807–809; 340/568.1, 571, 568.8, 340/568.4; 248/187.1, 206.4, 229.11, 310, 248/521, 523; 429/100, 123, 163; 439/500, 439/550, 630, 638, 660, 928, 928.1
See application file for complete search history.

(56) References Cited

U.S. PATENT DOCUMENTS

| | | | | |
|---|---|---|---|---|
| 5,506,749 | A * | 4/1996 | Matsuda | 361/679.58 |
| 5,764,477 | A * | 6/1998 | Ohgami et al. | 361/679.55 |
| 6,078,496 | A * | 6/2000 | Oguchi et al. | 361/679.55 |
| 6,385,039 | B1 * | 5/2002 | Chiang et al. | 361/679.09 |
| 7,199,999 | B2 * | 4/2007 | Shin et al. | 361/679.55 |
| 7,236,356 | B2 * | 6/2007 | Ulla et al. | 361/679.21 |
| 2008/0259551 | A1 * | 10/2008 | Gavenda et al. | 361/684 |
| 2010/0081473 | A1 * | 4/2010 | Chatterjee et al. | 455/559 |

* cited by examiner

*Primary Examiner* — Hung S Bui
(74) *Attorney, Agent, or Firm* — Shook Hardy Bacon, LLP (57) ABSTRACT

An electronic device includes a casing and a battery module removably locked to the casing. The casing includes a connecting wall, two inner side walls connected to opposite ends of the connecting wall and having pillars protruding therefrom, and a first magnetic member disposed at the connecting wall. The battery module includes a first side wall to abut against the connecting wall, and two second side walls connected to two opposite ends of the first sidewall. A second magnetic member is disposed at the first side wall and has a magnetic attraction force with the first magnetic member. Each second side wall is formed with a guiding groove extending along an insertion direction of the battery module for engaging a corresponding pillar.

10 Claims, 8 Drawing Sheets

ELECTRONIC DEVICE

CROSS-REFERENCE TO RELATED APPLICATION

This application claims priority of Taiwanese Application No. 100116337, filed on May 10, 2011, the entire disclosure of which is incorporated herein by reference.

BACKGROUND

1. Field

The present disclosure relates to an electronic device, more particularly to an electronic device provided with a locking mechanism for locking a battery module.

2. Description of the Related Art

Currently, a conventional locking mechanism for a battery module of a notebook computer is generally a lock member that is disposed in a casing of the notebook computer and that has an engaging groove formed therein. The lock member is biased by a biasing spring so that the lock member is normally in a locked position. The battery module has a hook member that is to be engaged with the engaging groove. When the battery module is to be assembled and secured to the casing, the hook member is first aligned with the engaging groove, and then the battery module is pushed to engage the hook member with the engaging groove, thereby locking the battery module on the casing. When the battery module is to be removed, the lock member is slid relative to the casing to an unlocked position where the engaging groove of the lock member and the hook member of the battery module are disengaged from one another, so that the battery module can be removed from the casing.

However, such an engagement between the hook member and the engaging groove is not convenient for assembly and disassembly processes. In particular, in the assembly process, a user has to exert a force to push the battery module so as to enable the hook member to engage the engaging groove. Therefore, the hook member may easily break. Further, the lock member of the conventional locking mechanism and the biasing spring occupy space inside the casing, resulting in inefficient use of the space inside the casing. Furthermore, a number of components of the conventional locking mechanism is relatively large, and may complicate design and manufacture of the locking mechanism, so that a manufacturing cost of the conventional locking mechanism is increased.

SUMMARY

Therefore, the present disclosure is to provide an electronic device including a casing and a battery module that can be conveniently and quickly assembled and secured to the casing and removed from the casing.

Accordingly, an electronic device of the present disclosure includes a casing and a battery module.

The casing includes a connecting wall that has two opposite ends, two inner side walls that are connected to the opposite ends of the connecting wall respectively and that are spaced apart from one another, and at least one first magnetic member that is disposed at the connecting wall. The connecting wall and the inner side walls cooperatively define a receiving space. Each of the inner side walls has a pillar protruding therefrom.

The battery module is removably disposed in the receiving space and includes a housing and at least one second magnetic member. The housing includes a first side wall to abut against the connecting wall and that has two opposite ends, and two second side walls that are connected respectively to the opposite ends of the first sidewall. The second magnetic member is disposed at the first side wall and has a magnetic attraction force with the first magnetic member. Each of the second sidewalls is formed with a guiding groove. The guiding groove includes a positioning portion that extends along an insertion direction of the battery module into the casing for engagement with the pillar on a corresponding one of the inner side walls, and an inclining portion that spatially communicates the positioning portion with an ambient space for guiding sliding movement of the pillar into the positioning portion.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
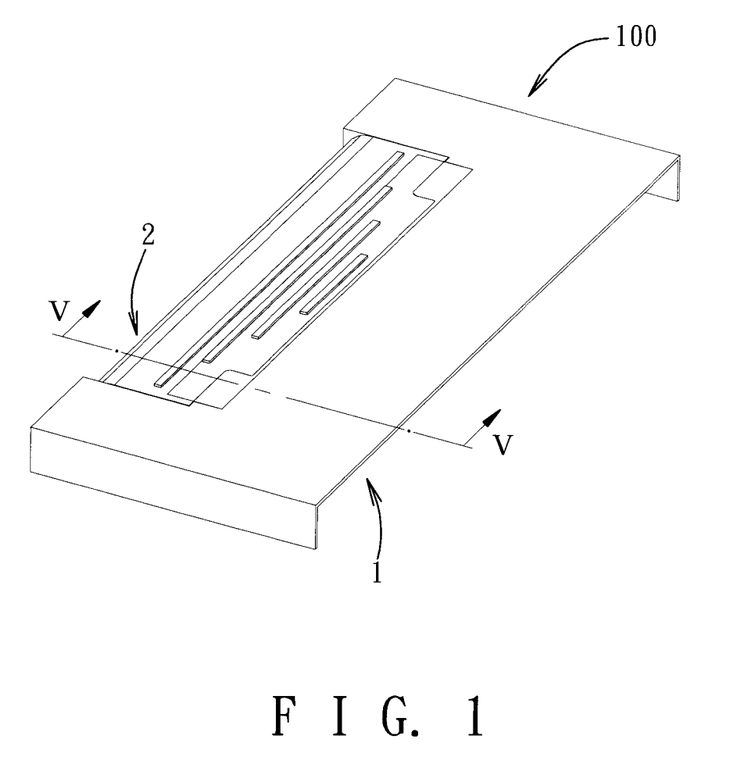
FIG. 1 is a perspective view of an embodiment of an electronic device according to the present invention.
Figure 2:
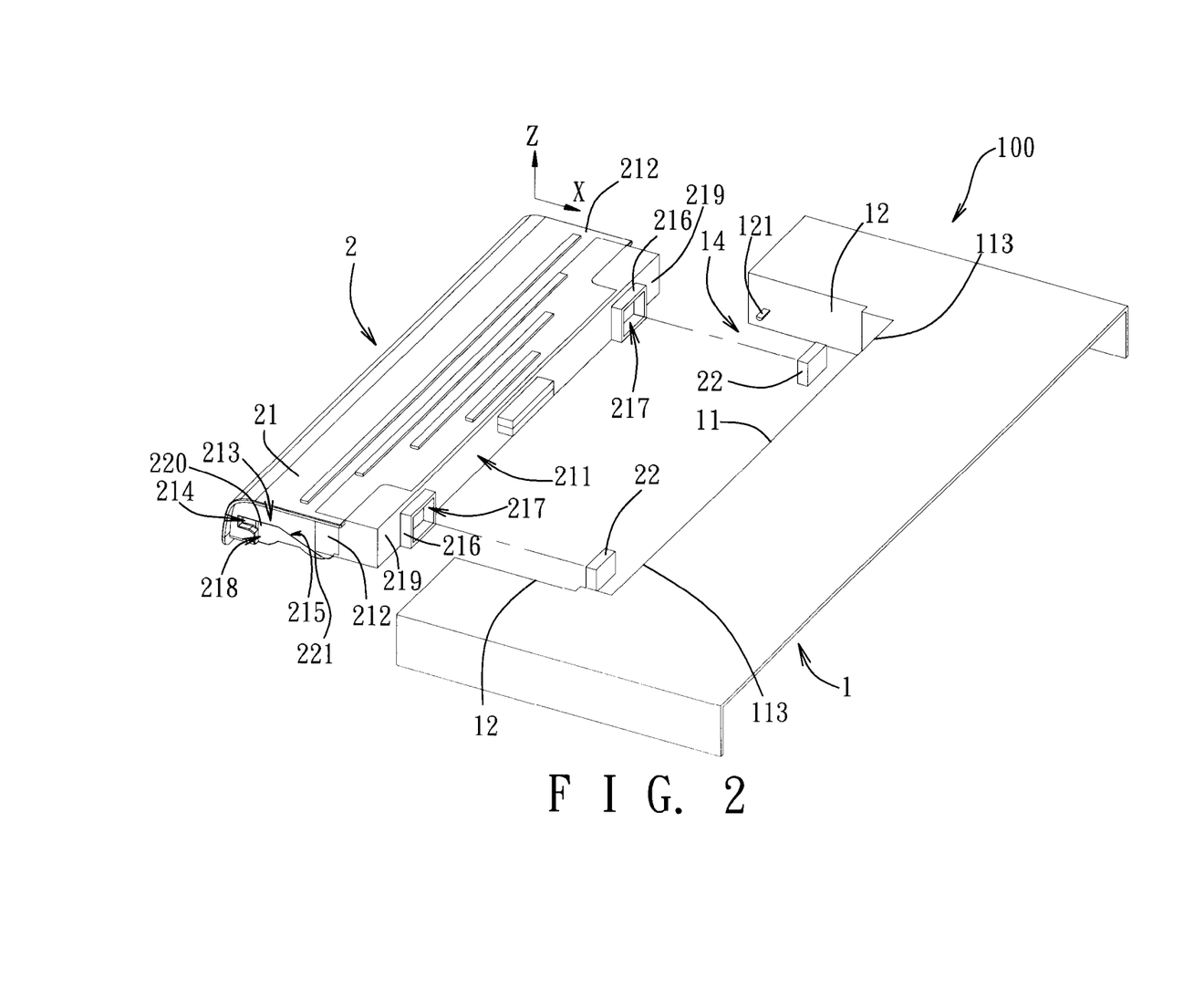
FIG. 2 is an exploded perspective view of the electronic device of the embodiment according to the present invention.

Referring to FIGS. 1 and 2, an embodiment of an electronic device 100 of the present disclosure includes a casing 1 and a battery module 2. The battery module 2 may be connected electrically to a circuit board (not shown) disposed in the casing 1 by means of insertion of a plug electrical connector (not shown) into a socket electrical connector of the circuit board so as to provide electrical power to the circuit board. In this embodiment, the electronic device 100 is illustrated as, for example, a notebook computer, and only a part of the structure of the electronic device 100 is shown in FIG. 1. Certainly, the electronic device 100 may be a tablet computer, a mobile phone or a personal digital assistant.

Figure 3:
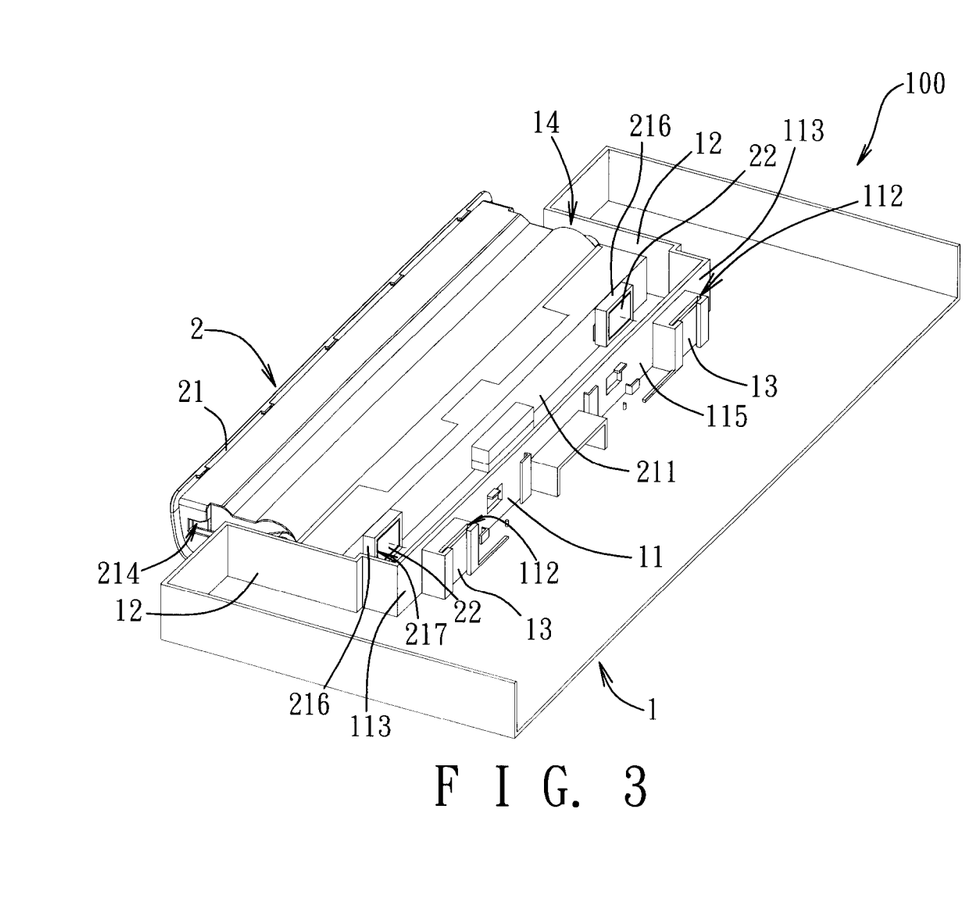
FIG. 3 is an exploded perspective view of the electronic device of the embodiment according to the present invention.
Figure 4:
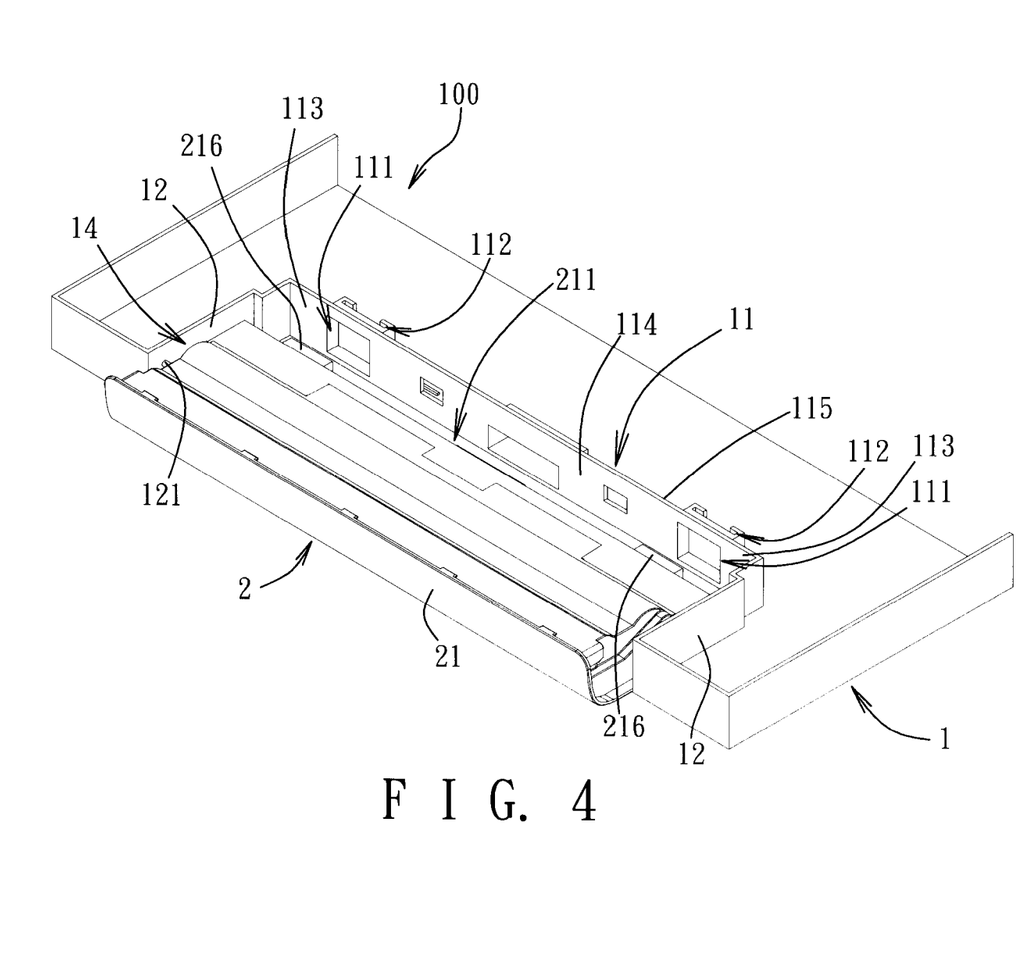
FIG. 4 is an exploded perspective view of the electronic device of the embodiment according to the present invention.

As shown in FIGS. 2, 3 and 4, the casing 1 includes a connecting wall 11 having two opposite ends 113, two inner side walls 12 connected respectively to the opposite ends 113 of the connecting wall 11 and spaced apart from one another, and at least one first magnetic member 13 disposed at the connecting wall 11. The connecting wall 11 and the inner side walls 12 cooperatively define a receiving space 14. Each of the inner side walls 12 has a pillar 121 protruding therefrom (only one is visible due to the viewing angle). The battery module 2 is removably disposed in the receiving space 14 and includes a housing 21 and at least one second magnetic member 22. The housing 21 includes a first side wall 211 to abut against the connecting wall 11 and that has two opposite ends 219, and two second side walls 212 that are connected respectively to the opposite ends 219 of the first side wall 211. The second magnetic member 22 is disposed at the first side wall 211 and has a magnetic attraction force with the first magnetic member 13. Each of the second side walls 212 is formed with a guiding groove 213. Each of the guiding groove 213 includes a positioning portion 214 that extends along a horizontal direction (X) (i.e., an insertion direction of the battery module 2 into the receiving space 14) for engagement with a respective one of the pillars 121, and an inclining portion 215 that spatially communicates the positioning portion 214 with an ambient space for guiding sliding movement of the pillar 121 into the positioning groove portion 214. By virtue of the magnetic attraction force between the second magnetic member 22 of the battery module 2 and the first magnetic member 13 of the casing 1, the battery module 2 can be conveniently and quickly assembled and secured to the casing 1 or removed from the casing 1.

Next, the structure and the assembly and disassembly operations of the battery module 2 of the electronic device 100 will be described in detail hereinafter.

As shown in FIGS. 2, 3 and 4, in this embodiment, the casing 1 includes a plurality of the first magnetic members 13, and the battery module 2 includes a plurality of the second magnetic members 22. A number of the second magnetic members 22 is identical to that of the first magnetic members 13. In this embodiment, each of the first magnetic members 13 is a magnetic metal component, such as an iron sheet, while each of the second magnetic members 22 is a magnet that attracts the magnetic metal component of a corresponding one of the first magnetic members 13 through the magnetic attraction force therebetween. Of course, in design, each of the first magnetic members 13 may be a magnet while each of the second magnetic members 22 may be a magnetic metal component. Alternatively, the first magnetic members 13 and the second magnetic members 22 are both magnets. In addition, the number of the first magnetic members 13 and the second magnetic members 22 may vary according to different requirement in other embodiments. For example, the number of both of the first magnetic member 13 and the second magnetic member 22 may be one, and should not be limited to the disclosure of this embodiment.

The inclining portion 215 of each of the guiding grooves 213 is adjacent to the first side wall 211, and has a distal end 220 away from the first side wall 211 and an opening 221 in spatial communication with the ambient space. The positioning portion 214 of each of the guiding grooves 213 is in spatial communication with the distal end 220 of a corresponding one of the inclining groove portions 215. When the second magnetic members 22 of the battery module 2 attract the first magnetic members 13 of the casing 1 through the magnetic attraction force, respectively, the battery module 2 is in a locked position in the casing 1. At this time, the pillar 121 of each of the side walls 12 is engaged with the positioning portion 214 of a respective one of the guiding grooves 213. The attraction between the second magnetic members 22 and the first magnetic members 13 limits a movement of the battery module 2 relative to the casing 1 in the horizontal direction (X), while the engagement of the pillar 121 of each of the inner side walls 12 with the positioning portion 214 of the corresponding one of the guiding grooves 213 limits a movement of the battery module 2 relative to the casing 1 in a vertical direction (Z) (i.e., a thickness direction of the battery module 2 that is perpendicular to the horizontal direction (X)). Thus, the battery module 2 can be locked stably on the casing 1 without shaking relative to the casing 1.

Further, the connecting wall 11 of the casing 1 has an outer surface 114 facing the receiving space 14 and formed with a plurality of engaging sockets 111 that are in spatial communication with the receiving space 14. The first side wall 211 of the battery module 2 includes a plurality of protrusions 216. A number of the protrusions 216 is identical to that of the engaging sockets 111, and the protrusions 216 correspond to and are registered with the engaging sockets 111 in position, respectively. Each of the protrusions 216 is fittingly disposed in and engaged with a respective one of the engaging sockets 111 so as to limit the movement of the first side wall 211 of the battery module 2 relative to the connecting wall 11 of the casing 1 in the vertical direction (Z). Thus, each of the second magnetic members 22 can be maintained at a position that corresponds to and is registered with a position of a corresponding one of the first magnetic members 13 so as to prevent a reduction in the magnetic attraction force between the second magnetic members 22 and the first magnetic members 13 attributed to misalignment between the first and second magnetic members 13, 22.

The connecting wall 11 of the casing 1 further has an inner surface 115 opposite to the outer surface 114 and formed with a plurality of slots 112. Each of the slots 112 corresponds to a respective one of the engaging sockets 111 in position, and a number of the slots 112 is identical to that of the first magnetic members 13. Each of the first magnetic members 13 is disposed and secured in a corresponding one of the slots 112, for example, by fitting engagement or adhesive attachment. Each of the protrusions 216 on the first side wall 211 is formed with a receiving socket 217 in which a corresponding one of the second magnetic members 22 is disposed and secured, for example, by fitting engagement or adhesive attachment. Through the configuration of the first magnetic members 13 disposed in the slots 112 and being registered with the engaging sockets 111, as well as the configuration of the second magnetic members 22 disposed in the receiving sockets 217, each of the second magnetic members 22 corresponds to and is registered with the respective one of the first magnetic members 13 in position and attracts magnetically the same when each of the protrusions 216 of the battery module 2 is secured in the respective one of the engaging sockets 111. In addition, when the first side wall 211 is moved toward the connecting wall 11 during an assembly process, since each of the protrusions 216 surrounds a respective one of the second magnetic members 22 and prevents the movement of the same, the second magnetic members 22 may not be loosened from the first side wall 211 due to collision with the connecting wall 11, thereby ensuring the stability of the second magnetic members 22 on the first side wall 211.

Figure 5:
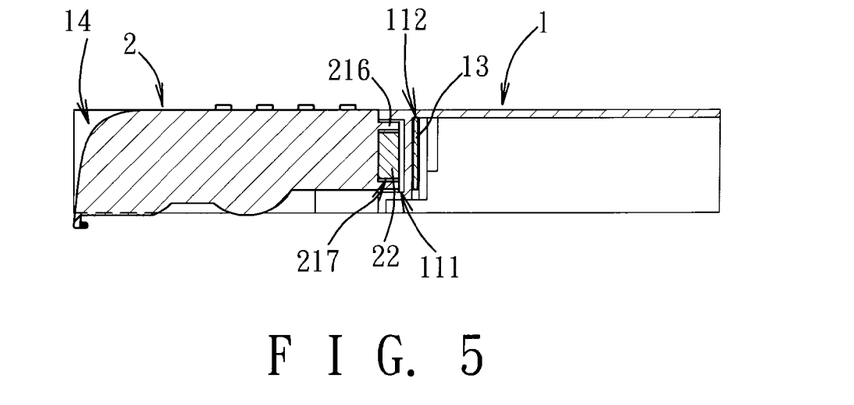
FIG. 5 is a schematic cross-sectional view taken along line V-V in FIG. 1.
Figure 6:
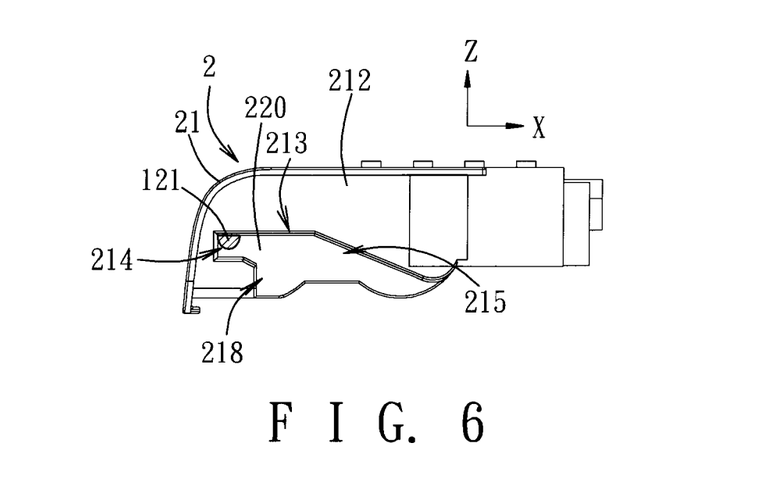
FIG. 6 is a side view of a battery module of the electronic device of the embodiment according to the present invention.

As shown in FIGS. 5 and 6, when the battery module 2 is assembled in the receiving space 14 of the casing 1, each of the second magnetic members 22 magnetically attracts the respective one of the first magnetic members 13, each of the protrusions 216 is fittingly disposed in the respective one of the engaging sockets 111, and the pillar 121 on each of the inner side walls 12 engages the positioning portion 214 of the respective one of the guiding groove 213, thereby locking stably the battery module 2 on the casing 1.

Figure 7:
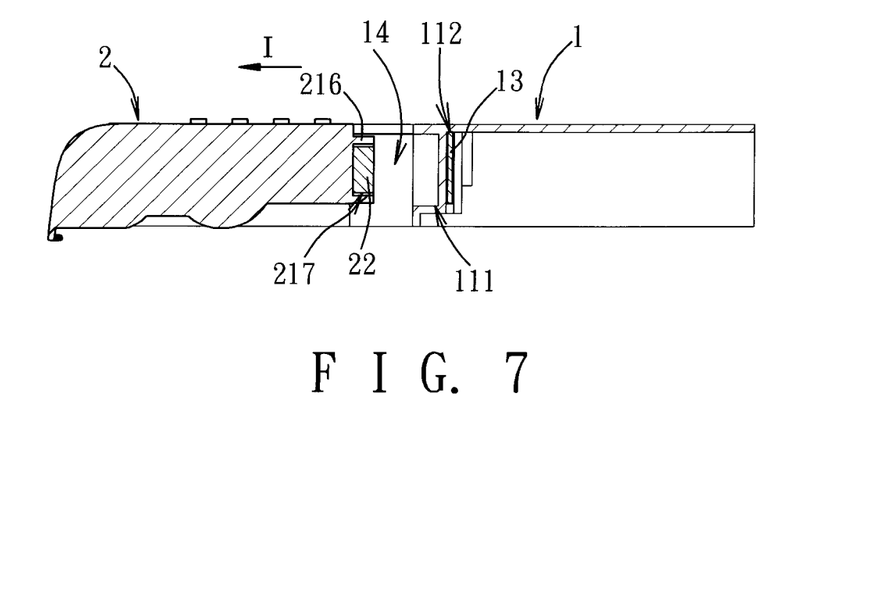
FIGS. 7 to 10 are schematic views illustrating assembly/disassembly operation of the battery module of the electronic device according to the present invention.
Figure 8:
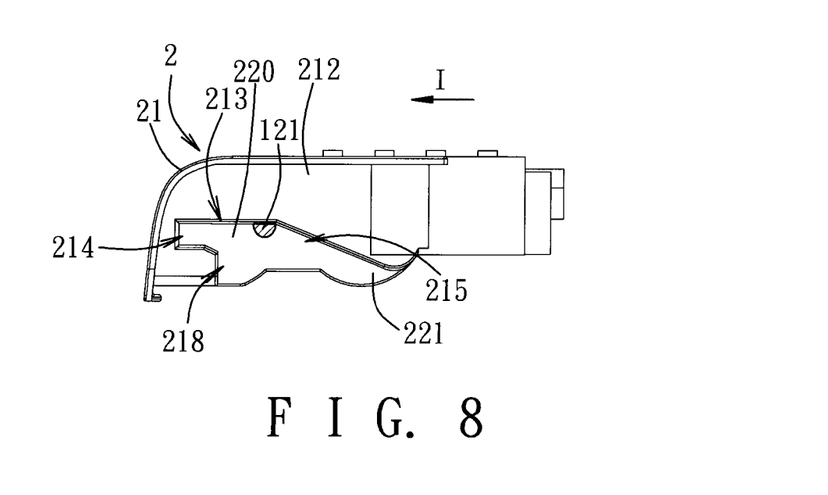

As shown in FIGS. 7 and 8, since the pillar 121 on each of the inner side walls 12 is limited by and engaged in the positioning portion 214 of the respective one of the guiding grooves 213, a user has to exert a force to the battery module 2 horizontally along a direction indicated by arrow (I) (i.e., a direction opposite to the insertion direction of the battery module 2) to pull and move the battery module 2 a distance outward of the receiving space 14 when it is desired to remove the battery module 2 from the receiving space 14 of the casing 1. As a result, the second magnetic members 22 are detached respectively from the first magnetic members 13, and the battery module 2 is moved into an unlocked position from the locked position with respect to the casing 1.

Figure 9:
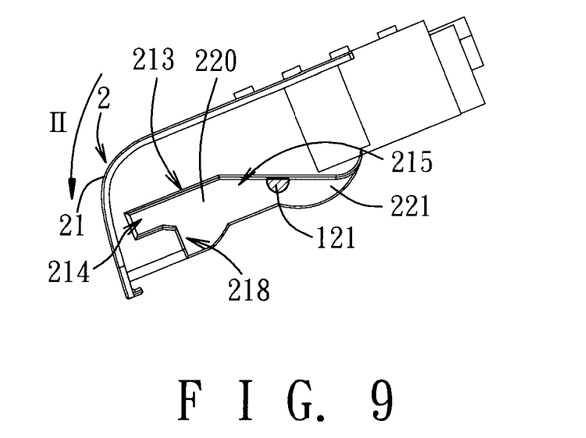
Figure 10:
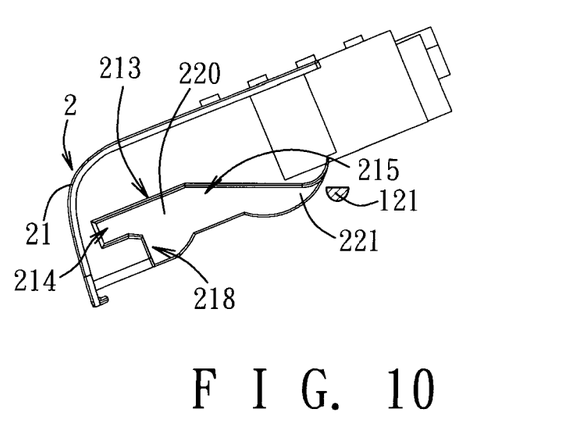

Referring to FIGS. 8, 9 and 10, when the battery module 2 is moved to a position where each of the inclining portions 215 corresponds to the corresponding one of the pillars 121, that is to say, the corresponding one of the pillars 121 is at the distal end 220 as shown in FIG. 8, the battery module 2 may be further rotated in a direction indicated by an arrow (II) as the pillars 121 slide into the inclining portions 215 as shown in FIG. 9, so that each of the pillars 121 is moved out of the opening 221 of a corresponding one of the inclining portions 215 as shown in FIG. 10. The battery module 2 may be removed from the receiving space 14 after the pillars 121 are completely removed from the inclining portions 215.

Figure 11:
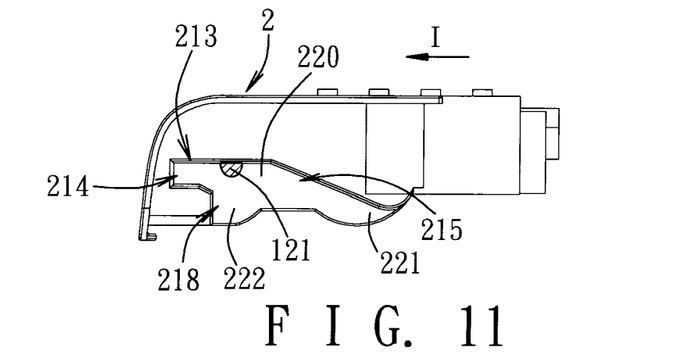
FIGS. 11 and 12 are schematic views illustrating assembly/disassembly operation of the battery module of the electronic device according to the present invention.
Figure 12:
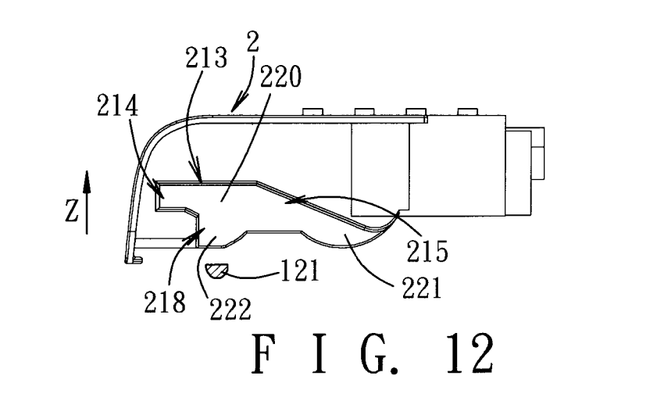

Referring to FIGS. 11 and 12, in this embodiment, each of the guiding grooves 213 further includes a communication portion 218 that is in spatial communication with a corresponding one of the inclining portions 215 and a part of a corresponding one of the positioning portions 214. The communication portion 218 has an opening 222 in spatial communication with the ambient space in the vertical direction (Z), so that the pillars 121 can be inserted into the positioning portions 214 through the communication portions 218. By virtue of the configuration of the communication portions 218, during the disassembly process of the battery module 2, the battery module 2 may be first moved horizontally along the direction (I) to the position where each of the communication portions 218 corresponds to a corresponding one of the pillars 121 as shown in FIG. 11. Then, the battery module 2 is pulled upwardly in the vertical direction (Z) so that each of the pillars 121 can be removed from the corresponding one of the communication portions 218 through the opening 222. When the pillars 121 are removed completely from the communication portions 218 as shown in FIG. 12, the battery module 2 may be removed from the receiving space 14, thereby providing another way for disassembling the battery module 2. Therefore, the flexibility of disassembly may be enhanced.

Figure 13:
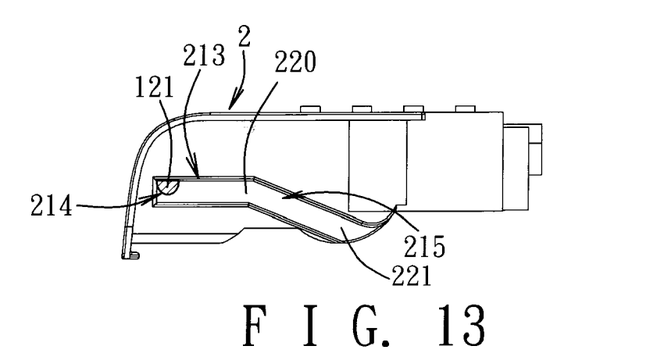
FIG. 13 is a side view of another example of the battery module of the electronic device of the embodiment according to the present invention.

By virtue of the configuration of the guiding grooves 213, the battery module 2 is required to move in two different directions so as to be removed from the receiving space 14 during the disassembly process of the battery module 2. Therefore, when the electronic device 100 is unintentionally touched or vibrated to result in detachment of the second magnetic members 22 from the first magnetic members 13, the battery module 2 can be prevented from being removed easily from the receiving space 14 and falling down to the ground. It is noted that, in another example of the battery module 2 as illustrated in FIG. 13, the communication portions 218 of the guiding grooves 213 may be omitted while the effect of preventing easy removal of the battery module 2 from the receiving space 14 can be likewise achieved.

As shown in FIGS. 8 and 11, when the battery module 2 is to be assembled into the receiving space 14 of the casing 1 (as illustrated in FIG. 5), a space allowing the insertion of each of the pillars 121 into a corresponding one of the positioning portions 214 may be increased since the communication portions 218 are in spatial communication respectively with the inclining portions 215. Therefore, the user may easily register each of the guiding grooves 213 with a corresponding one of the pillars 121 so as to insert the pillars 121 respectively into the positioning portions 214. Thereafter, the battery module 2 may be horizontally moved a distance in a direction opposite to the direction indicated by the arrow (I), i.e., the horizontal direction (X), such that each of the protrusions 216 is fittingly inserted into a corresponding one of the engaging sockets 111 (as shown in FIG. 5). At this time, the pillars 121 are engaged respectively with the positioning portions 214, and each of the second magnetic members 22 attracts a corresponding one of the first magnetic members 13, so that the battery module 2 is locked on the casing 1.

While the present disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An electronic device comprising:
   a casing including a connecting wall that has two opposite ends, two inner side walls that are connected to said opposite ends of said connecting wall respectively and that are spaced apart from one another, and at least one first magnetic member that is disposed at said connecting wall, said connecting wall and said inner side walls cooperatively defining a receiving space, each of said inner side walls having a pillar protruding therefrom; and
   a battery module removably disposed in said receiving space and including a housing and at least one second magnetic member, said housing including a first side wall to abut against said connecting wall and that has two opposite ends, and two second side walls that are connected respectively to said opposite ends of said first side wall, said second magnetic member being disposed at said first side wall and having a magnetic attraction force with said first magnetic member, each of said second sidewalls being formed with a guiding groove, said guiding groove including a positioning portion that extends along an insertion direction of said battery module into said casing for engagement with said pillar on a corresponding one of said inner side walls, and an inclining portion that spatially communicates said positioning portion with an ambient space for guiding sliding movement of said pillar into said positioning portion.

2. The electronic device as claimed in claim 1, wherein said inclining portion is adjacent to said first side wall and has a distal end away from said first side wall, and said positioning portion is in spatial communication with said distal end of said inclining portion.

3. The electronic device as claimed in claim 2, wherein said guiding groove further includes a communication portion that is in spatial communication with said positioning portion and the ambient space, said pillar being insertable into said positioning portion through one of said communication portion and said inclining portion.

4. The electronic device as claimed in claim 3, wherein said connecting wall further has an outer surface facing said receiving space and formed with an engaging socket in spatial communication with said receiving space, and said first side wall includes a protrusion that is fittingly disposed in and engaged with said engaging socket.

5. The electronic device as claimed in claim 4, wherein said connecting wall further has an inner surface opposite to said outer surface and formed with a slot which corresponds to said engaging socket in position and in which said first magnetic member is disposed, and said protrusion of said first side wall is formed with a receiving socket in which said second magnetic member is disposed.

6. The electronic device as claimed in claim 5, wherein said first magnetic member is one of a magnetic metal component and a magnet, and said second magnetic member is the other one of said magnetic metal component and said magnet.

7. The electronic device as claimed in claim 5, wherein each of said first magnetic member and said second magnetic member is a magnet.

8. The electronic device as claimed in claim 1, wherein said connecting wall further has an outer surface facing said receiving space and formed with an engaging socket in spatial communication with said receiving space, and said first side wall includes a protrusion that is fittingly disposed in and engaged with said engaging socket.

9. The electronic device as claimed in claim 8, wherein said connecting wall further has an inner surface opposite to said outer surface and formed with a slot which corresponds to said engaging socket in position and in which said first magnetic member is disposed, and said protrusion of said first side wall is formed with a receiving socket in which said second magnetic member is disposed.

10. The electronic device as claimed in claim 1, wherein said casing includes a plurality of said first magnetic members disposed at said connecting wall, and said battery module includes a plurality of said second magnetic members disposed at said first side wall, each of said second magnetic members having a magnetic attraction force with a respective one of said first magnetic members.

* * * * *